United States Patent [19]

Ishida et al.

[11] Patent Number: 4,779,157
[45] Date of Patent: Oct. 18, 1988

[54] A SHAFT HAVING A GROOVE FOR A VIDEO TAPE CARTRIDGE AND METALLIC MOLDS FOR ITS PREPARATION

[75] Inventors: Toshihiko Ishida; Masatoshi Okamura; Yuji Ishikawa, all of Tokyo, Japan

[73] Assignee: TDK Corporation (Representative Yutaka Otoshi), Tokyo, Japan

[21] Appl. No.: 23,718

[22] Filed: Mar. 9, 1987

Related U.S. Application Data

[63] Continuation of Ser. No. 625,560, Jun. 28, 1984, abandoned.

[30] Foreign Application Priority Data

Jul. 4, 1983 [JP] Japan ................... 58-120309

[51] Int. Cl.$^4$ ............................................. G11B 23/02
[52] U.S. Cl. .................................................... 360/132
[58] Field of Search ............... 360/132; 242/197–200; 206/387; 352/72, 78; 264/328.9, 328.12

[56] References Cited

U.S. PATENT DOCUMENTS

| | | | |
|---|---|---|---|
| 4,180,220 | 12/1979 | Shiba et al. | 242/197 |
| 4,214,719 | 7/1980 | Kato | 360/132 |
| 4,358,070 | 11/1982 | Okamura et al. | 242/197 |
| 4,533,093 | 8/1985 | Gelardi et al. | 242/197 |

Primary Examiner—Stuart N. Hecker
Assistant Examiner—David J. Severin
Attorney, Agent, or Firm—Fleit, Jacobson, Cohn & Price

[57] ABSTRACT

This invention relates to a tape protecting cover of a video tape cartridge, especially to a shaft having a groove the shaft being formed integrally with the tape protecting cover. A first and second molds 12 and 14 divided by the parting line 20 have dents 16 and 18 respectively to form a space when both molds are joined. The dent 16 of the first mold 12 is provided with a rectangular pin 22 for forming a groove so that its one end surface 22a may abut to the end wall surface 16a of the dent 16. The front side 22b of the rectangular pin 22 extends so as to extrude to the dent 18 of the mold 14, and is constructed to form an inclined surface 22c between the end surface 22a of the rectangular pin 22 and itself. The end wall surface 18a of the dent 18 of the second metallic mold 14 is formed to have a same inclined angle $\theta$ as the rectangular pin so as to abut to the inclined surface 22c of the rectangular pin 22 when both metallic molds are joined.

3 Claims, 3 Drawing Sheets

A SHAFT HAVING A GROOVE FOR A VIDEO TAPE CARTRIDGE AND METALLIC MOLDS FOR ITS PREPARATION

This application is a continuation of application Ser. No. 625,560 filed June 28, 1984 now abandoned.

BACKGROUND OF THE INVENTION

This invention relates to a tape protecting cover for a video tape cartridge, especially a tape protecting cover provided with a grooved shaft integrally formed on said tape cover which is adapted to be mounted to a case body. The groove retains a spring for biasing the cover towards the case body. Further, this invention relates to metallic molds for forming a shaft having a groove for retaining the spring of the protecting cover of a video tape cartridge formed by injection molding of a synthetic resin.

A video cartridge containing a video tape therein has a tape protecting cover prepared by injection molding of a synthetic resin, which covers the front portion or opening of a case body consisting of upper and lower pieces. The tape protecting cover is adapted to be opened to allow the tape in the video tape cartridge to be drawn out toward a rotary head side when the video tape cartridge is loaded in a video tape recorder, and to be closed to protect the tape when the video tape cartridge is taken out from the video tape recorder. For this purpose, shafts are provided at both end portions of the tape protecting cover, one of said shafts being inserted in a hole formed in the case body, while the other shaft inserted in another hole in the case body and is provided with a spring for biasing the tape protecting cover in a stationary closed status, whereby said protecting cover is rotatively mounted to the case body. FIG. 1 shows the secured status of the tape protecting cover 2 and the case body 4, in which the tape protecting cover 2 and the case body (upper case body) at the side of the shaft 8 provided with the spring 6 is shown. In general, a coil spring is used as the spring 6, one end 6a of the coil spring abutting against the case body 4 and the other end 6b being secured to the shaft 8. More specifically, the shaft 8 is provided with a groove 10 which receives the end 6b of the spring 6 extending transversely from the axial end to a fixed length as shown in FIG. 2, whereby the spring is permitted to be loaded onto the shaft 8 in the X direction.

The tape protecting cover 2 having the above structure is prepared integrally by injection molding of a synthetic resin. In this case, heretofore, in order to make the shaft having groove 8 to be a cylindrical type provided with such a groove, such process as shown in FIG. 3 is adopted wherein two molds 12 and 14 having semi-cylindrical dents 16 and 18 are prepared and both molds 12 and 14 are allowed to move in a direction shown by the arrow Y to close on each other, thereby forming a cylindrical molding space having a complementary shape for the shaft 8. A resin is poured into the space to form the shaft 8 followed by the steps of separating both molds 12 and 14 after cooling and solidification. The plane 20 of the mated surface of the molds 12 and 14 (parting line) is so formed that the plane 20 passes through the axis of the shaft 8. Further, a rectangular pin 22 which is to form the groove 10 is provided so that the end surface 22 of rectangular pin 22 abut against the wall surface 16a positioned at the most inner portion of the semi-cylindrical dent 16 of the first mold 12 and extends in the Y direction. The depth of the groove 10 of the shaft 8 is preferably as deep as possible and extends across the axis of the shaft 8. Therefore, the front side 22b of rectangular pin 22 protrudes over the parting plane 20 from the mold 12. Accordingly, when both molds are closed on each other, front side 22b of the rectangular pin 22 protrudes into the dent 18 of the second mold 14.

When the shaft having the groove 8 of the tape protecting cover is molded by injection using the molds 12 and 14 described above, the end portion 22a of the rectangular pin 22 provided in the first mold 12 contacts with the end surface 18a at the most inner portion of the second mold 18. At this time, if the end surface 22a of the rectangular pin 22 does not contact closely with end surface 18a of the second mold 18, a clearance occurs between end surface 18a and end surface 22a and the resin is deposited in this clearance to form a burr. The control of the contact between the end surface 22a of such rectangular pin 22 and the end surface 18a of the mold 18 is difficult and prevention of the occurrence of the burr is difficult. Further, such burr also occurs by wearing of the rectangular pin 22 due to use. Accordingly, in the conventional shaft having a groove for securing the spring, the burr is generally formed soon after initial molding operations. Therefore, the extra subsequent work for removing of the burr is necessary after injection molding. This causes complication of the manufacturing process and lowers the efficiency of mass production, thereby increasing the cost of products.

SUMMARY OF THE INVENTION

Accordingly, this invention has an object to provide a shaft having a groove for a tape protecting cover of a video tape cartridge and a metallic mold for injection molding for manufacturing thereof.

Another object of this invention is to provide a metallic mold for injection molding which prevents formation of a burr by using a rectangular pin which is adjusted very easily when the rectangular pin which is secured to the metallic mold for forming the groove of said shaft is worn.

DETAILED DESCRIPTION OF THE INVENTION

The preferred embodiment of a shaft having a groove for attaching a spring for a tape protecting cover of a video tape cartridge and a metallic mold for its manufacture according to this invention will be hereinafter described with reference to the accompanying drawings.

Figure 1:
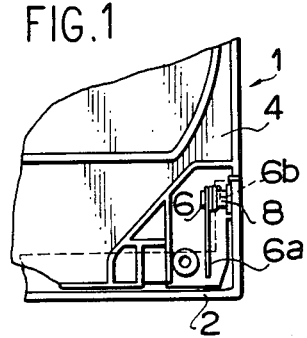
FIG. 1 is a partial plan view which shows a connecting part of a case body of a video cassette with a tape protecting cover. The partial plan view shows the status wherein the lower case body is removed.
Figure 2:
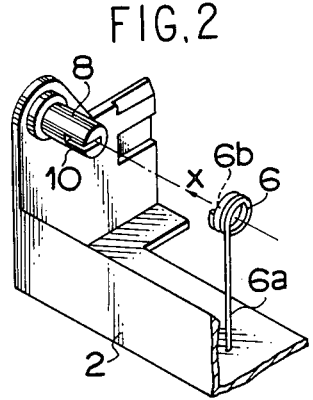
FIG. 2 is a perspective view which shows the shaft having a groove for the tape protecting cover.
Figure 3:
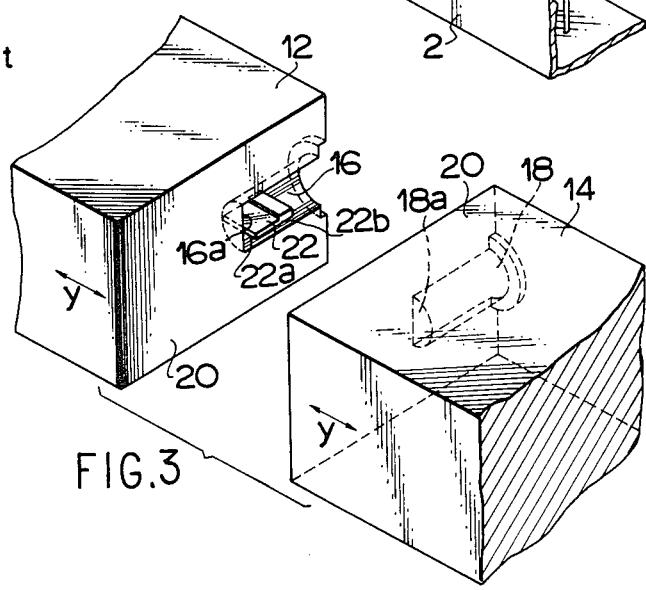
FIG. 3 is a perspective view of a conventional metallic mold for injection molding.
Figure 4:
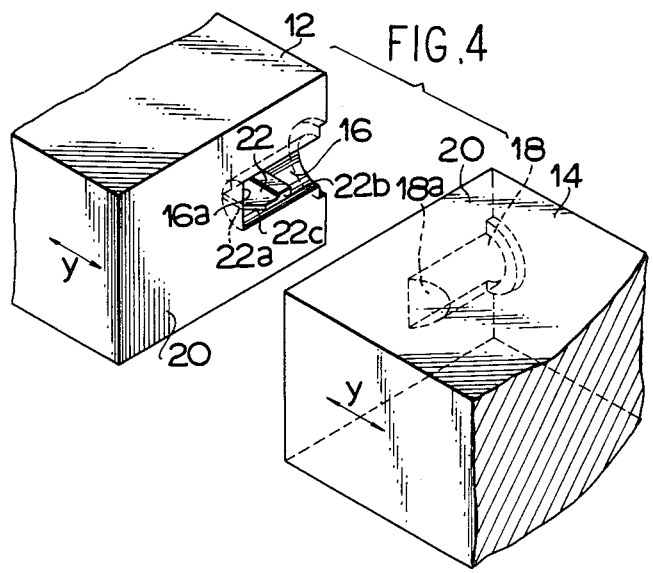
FIG. 4 is a perspective view of a metallic mold for injection molding according to this invention.
Figure 6:
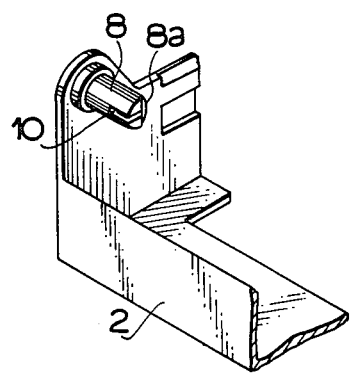
FIG. 6 is a perspective view of the shaft portion having a groove for a video tape cartridge according to this invention.

As clearly shown in FIG. 4 and FIG. 6, the fundamental structure for manufacturing the shaft having a groove according to this invention consists of a first metallic mold 12 and a second metallic mold 14 which are similar to the metallic molds shown in FIG. 3, each metallic mold 12 and 14 having a semi-circular dent 16 and 18 which forms a cylindrical space having the same shape as that of the shaft 8 when both metallic molds are mated. Further, a rectangular pin 22 is secured to one metallic mold 12 of the two molds. In this case, however, the metallic molds of this invention are different greatly from those of FIG. 3 in their shape at the most inner portions of the dents 16 and 18 of the metallic molds 12 and 14 where the rectangular pin 22 abuts against the wall of the dent 18.

More specifically, in the metallic molds of this invention, the rectangular pin 22 protrudes from the parting plane 20 toward the mold 14 and an inclined side 22c is formed at the corner extending from the end surface 22a of the rectangular pin 22 which bears against the end wall surface 16a of the dent 16 at the front side 22b. The angle θ (see FIG. 5) of the inclined side 22c may take any appropriate angle depending on the requirements of manufacture, although normally about 3°.

Figure 5:
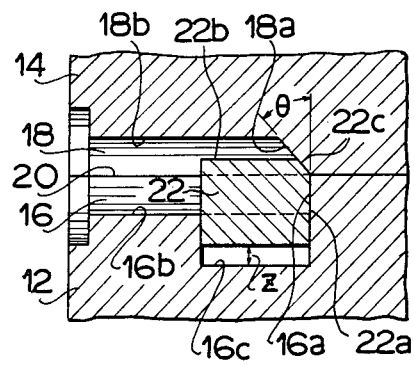
FIG. 5 is a transverse sectional view of the metallic mold.

The wall surface 18a of the most inner portion of dent 18 of the metallic mold 14 into which the rectangular pin 22 protrudes, is formed so as to have the same inclined angle θ as that of the inclined surface 22c of the rectangular pin 22, as most clearly shown in FIG. 5. Therefore, when both metallic molds 12 and 14 are closed against each other, the inclined surface 22c of the rectangular pin 22 is brought into close contact with the wall surface 18a of the dent 18.

Further, it will be easily understood that according to this invention the wearing of the rectangular pin 22 experienced in the traditional metallic molds shown in FIG. 3, due to the friction between the end portion at the corner of the end surface 22a of the rectangular pin 22 and the end wall 18a of the other metallic mold 14, is completely prevented. According to this invention, the inclined surface 22c of the rectangular pin 22 merely abuts against the end wall surface 18a of the other metallic mold 14 without being rubbed.

Figure 7:
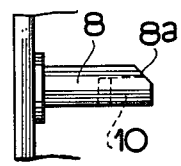
FIG. 7 is a plan view of the shaft portion having the groove of FIG. 6.

The shaft with the groove 8 according to this invention formed by injection molding with use of metallic molds having such structure as described above has an inclined surface 8a at the free end of a shaft 8 as shown in FIG. 6 and FIG. 7. Accordingly, it will be understood that there occurs no formation of the burr.

As easily understood, the rectangular pin 22 is inserted and slid under pressure into a receiving recess 16c formed in a wall 16b of the dent 16 of the metallic mold 12 in the Z direction. By such structure, it is possible to control the amount of insertion of the rectangular pin 22 into the dent 18 of another metallic mold. Further, even if the inclined surface 22c of the rectangular pin 22 is worn, the amount of wear of the rectangular pin 22 is compensated by moving the rectangular pin 22 in the Z direction toward the other mold, thereby preventing the occurence of the burr.

This invention provides a shaft having a groove without a burr. As a result, the productivity of the video tape cartridge is increased to a large extent by omitting the extra work for burr removal. Further, in the metallic molds of this invention it is easy to control the position of the rectangular pin for formng the groove to compensate for any clearance formed by wearing and thus a practical advantage is obtained in that a shaft having a groove superior in quality is prepared efficiently.

We claim:

1. A shaft located on one side of a tape protecting cover which is adapted to cover a front opening of a video tape cartridge, said shaft comprising:
    a cylindrical body,
    a groove defined by said cylindrical body for receiving and retaining one end of a coil spring adapted to bias said protecting cover in a cover-opening direction,
    a free end of said cylindrical body having a terminal edge, said groove terminating at said terminal edge, and
    a slanted surface defined by said free end to avoid formation of a burr during molding of said cylindrical body in a pair of molds, one mold including a recess shaped complementary to a semi-cylindrical portion of said cylindrical body and a rectangular pin shaped complementary to said groove, the other mold including a recess shaped complementary to the other semi-cylindrical portion of said cylindrical body and having a surface shaped complementary to said slanted surface, said slanted surface extending from and transverse to said terminal edge and terminating at the periphery of said cylindrical body.

2. A shaft as claimed in claim 1, wherein said groove includes two parallel sides.

3. A shaft as claimed in claim 2, wherein said slanted surface extends at a constant angle transverse to said terminal edge.

* * * * *